United States Patent [19]
Takano et al.

[11] Patent Number: 5,903,378
[45] Date of Patent: May 11, 1999

[54] SCANNING APPARATUS HAVING A CASCADE SCANNING OPTICAL SYSTEM

[75] Inventors: Masatoshi Takano; Eiji Takasugi, both of Saitama-ken; Shinji Kikuchi, Tokyo; Tsutomu Sato, Tokyo; Hiroyuki Saito, Tokyo; Yoshiyuki Araki; Mitsunori Iima, both of Saitama-ken; Takashi Sasaki, Nagano-ken; Takashi Iizuka, Saitama-ken, all of Japan

[73] Assignee: Asahi Kogaku Kogyo Kabushiki Kaisha, Tokyo, Japan

[21] Appl. No.: 09/001,561

[22] Filed: Dec. 31, 1997

[30] Foreign Application Priority Data

Jan. 6, 1997 [JP] Japan ..................... 9-000410

[51] Int. Cl.$^6$ ................................. G02B 26/08
[52] U.S. Cl. .................... 359/201; 359/204; 359/212; 359/216; 347/243
[58] Field of Search ................ 359/201, 202, 359/204, 212–219; 347/225, 233, 235, 241, 243; 250/234–236

[56] References Cited

FOREIGN PATENT DOCUMENTS

| 60-35712 | 2/1985 | Japan . |
| 60-57316 | 4/1985 | Japan . |
| 61-11720 | 1/1986 | Japan . |

OTHER PUBLICATIONS

Konica Technical Report vol. 9 (1996), along with an English language translation. (No Month).

*Primary Examiner*—James Phan
*Attorney, Agent, or Firm*—Greenblum & Bernstein, P.L.C.

[57] ABSTRACT

Disclosed is a scanning apparatus having a cascade scanning optical system. The scanning apparatus includes: a first laser scanning optical system for deflecting a first scanning laser beam to scan a scanning surface to generate a first scanning line during modulation of the first scanning laser beam in accordance with first given image data; a second laser scanning optical system for deflecting a second scanning laser beam to scan the scanning surface to generate a second scanning line during modulation of the second scanning laser beam in accordance with second given image data, wherein the first and second laser scanning optical systems are arranged so as to align the first scanning line with the second scanning line at a point of contact therebetween in a main scanning direction to form a single scanning line; a first laser beam detector fixed at a position to detect the first scanning laser beam before the first scanning laser beam starts generating the first scanning line; a second laser beam detector fixed at a position to detect the first scanning laser beam after the first scanning laser beam has completed generating the first scanning line; a measuring device for measuring a time interval; a determining device for determining a time-delay interval; and an adjusting device for adjusting the time at which the first scanning line starts to be generated, in accordance with the time-delay interval.

17 Claims, 6 Drawing Sheets

SCANNING APPARATUS HAVING A CASCADE SCANNING OPTICAL SYSTEM

BACKGROUND OF THE INVENTION

1. Field of the Invention

The present invention relates to a cascade scanning optical system having a pair of laser scanning optical systems which are arranged along the main scanning direction and controlled to operate in synchronization with each other so as to realize a wide scanning line. More specifically the present invention relates to a scanning apparatus having such a cascade scanning optical system in which the rotation of a polygon mirror of one laser scanning optical system is synchronized with the rotation of a polygon mirror of the other laser scanning optical system to prevent a pair of scanning lines that are to be aligned, respectively generated by the pair of laser scanning optical systems, from being deviated from each other in the main scanning direction.

2. Description of the Related Art

A cascade scanning optical system having a plurality of laser scanning optical systems arranged along the main scanning direction to realize a wide scanning line is known. Such a type of scanning optical system is disclosed in Japanese Laid-Open Patent Publication No.61-11720, published on Jan. 20, 1986. This publication discloses a cascade scanning optical system having a pair of laser scanning optical systems each having a laser beam emitter, a polygon mirror serving as a deflecting device, an fθ lens, etc. The pair of laser scanning optical systems are synchronously driven to emit respective scanning laser beams to a photoconductive surface (scanning surface) of a photoconductive drum on a common line thereon extending in parallel to the axial direction of the photoconductive drum. The pair of scanning laser beams respectively scan two adjacent ranges of the common line on the photoconductive surface so as to scan the photoconductive surface of the photoconductive drum in the main scanning direction in a wide range.

There is a fundamental problem to be overcome in such a type of cascade scanning optical system. Namely, how can a scanning line, made on the photoconductive drum by the scanning laser beam emitted from one laser scanning optical system of the cascade scanning optical system, be accurately aligned with another scanning line, made on the photoconductive drum by the scanning laser beam emitted from another laser scanning optical system of the cascade scanning optical system, so that the scanning lines are not apart from each other nor overlap each other in the main scanning direction, i.e., so as to form a straight and continuous scanning line using a combination of separate scanning lines.

Figure 2:
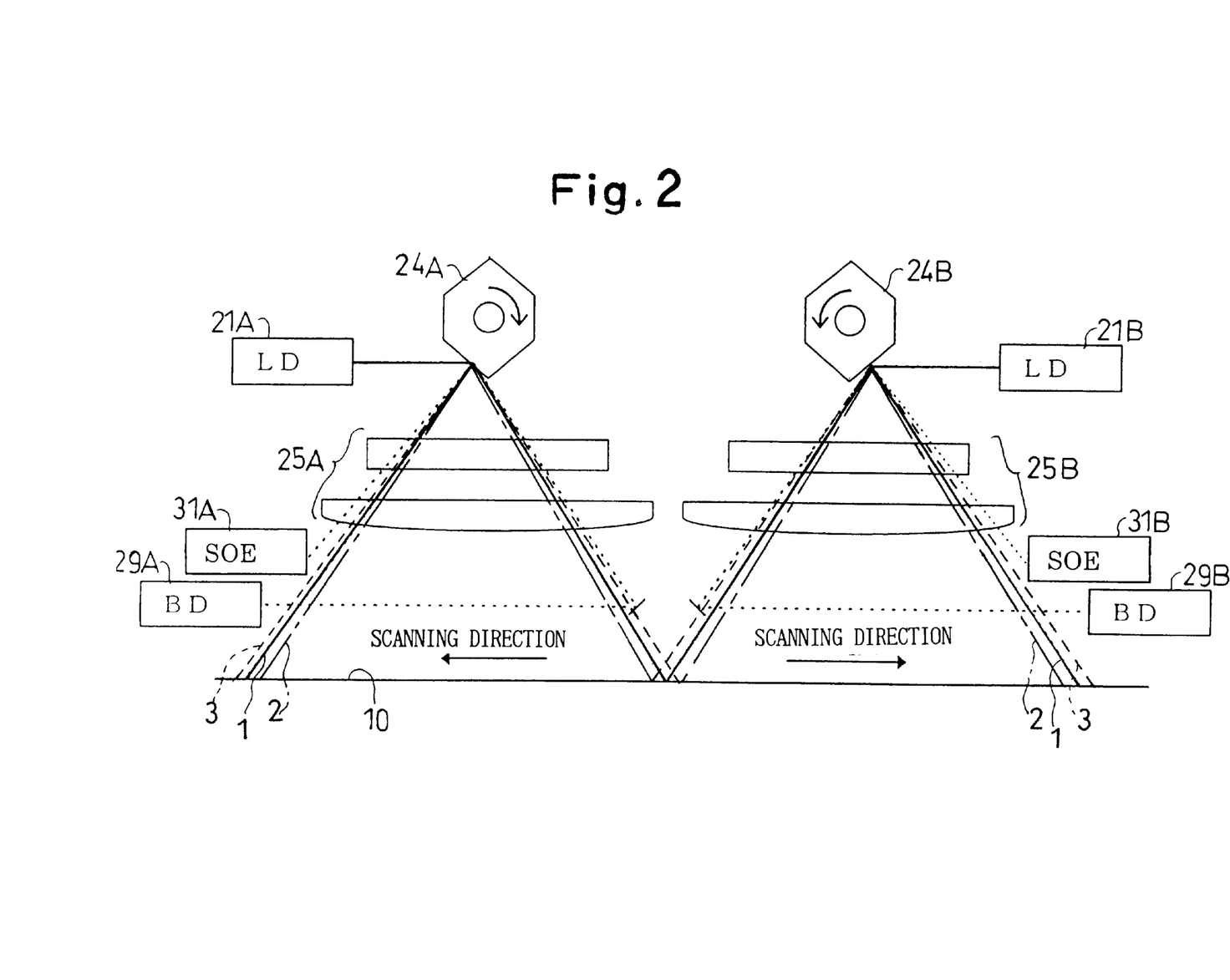
FIG. 2 is a plan view of a part of the cascade scanning optical system shown in FIG. 1.

The fθ lens or lens group, provided in each of the pair of laser scanning optical systems, is often made of plastic for the purpose of reducing the cost of production. It is well-known that a plastic lens is liable to be deformed and also the refractive power thereof is liable to change, due to a variation in temperature, humidity, etc. Therefore, in the case where such a variation in temperature, humidity, etc. occurs, the length of the scanning line made by a rotation of the corresponding polygon mirror by a specified angle of rotation (i.e. by a predetermined time interval) may vary even if the polygon mirror rotates at a constant speed. When such a variation in length of the scanning line occurs, the pair of scanning lines, which are to be aligned to form a straight and continuous scanning line, are apart from each other or overlap each other in the main scanning direction. In FIG. 2, respective scanning laser beams deflected by polygon mirrors 24A and 24B to scan a drum 10 (the photoconductive surface of the drum 10) are represented by solid lines 1, one-dot-chain lines 2 and broken lines 3. The scanning laser beams drawn by the solid lines 1 are of those when no deformation or variation in the refractive power occurs in each fθ lens and accordingly form a straight and continuous scanning line without the pair of scanning lines being apart from each other or overlapping each other in the main scanning direction (the horizontal direction as viewed in FIG. 2). The scanning laser beams drawn by the one-dot-chain lines 2 are of those when the length of each of the pair of scanning lines decreases due to a deformation in each fθ lens and accordingly form a discontinuous scanning line with the pair of scanning lines being apart from each other in the main scanning direction. The scanning laser beams drawn by the dotted lines 3 are of those when the length of each of the pair of scanning lines increases due to a deformation in each fθ lens and accordingly form a straight and continuous scanning line but the pair of scanning lines overlap each other in the main scanning direction.

SUMMARY OF THE INVENTION

The primary object of the present invention is to provide a scanning apparatus having a cascade scanning optical system in which a scanning line, made by the scanning laser beam emitted from one of a pair of laser scanning optical systems, and another scanning line, made by the other laser scanning optical system, are prevented from deviating from each other in the main scanning direction on a scanning surface.

To achieve the object mentioned above, according to an aspect of the present invention, there is provided a scanning apparatus having a cascade scanning optical system. The scanning apparatus includes: a first laser scanning optical system for deflecting a first scanning laser beam to scan a scanning surface to generate a first scanning line during modulation of the first scanning laser beam in accordance with first given image data; a second laser scanning optical system for deflecting a second scanning laser beam to scan the scanning surface to generate a second scanning line during modulation of the second scanning laser beam in accordance with second given image data, wherein the first and second laser scanning optical systems are arranged so as to align the first scanning line with the second scanning line at a point of contact therebetween in a main scanning direction to form a single scanning line; a first laser beam detector fixed at a position to detect the first scanning laser beam before the first scanning laser beam starts generating the first scanning line; a second laser beam detector fixed at a position to detect the first scanning laser beam after the first scanning laser beam has completed generating the first scanning line; measuring means for measuring a time interval between a time of detection of the first laser beam detector and a time of detection of the second laser beam detector; determining means for comparing a value corresponding to the time interval with a predetermined value to determine a time-delay interval between the time of detection of the first laser beam detector and a time at which the first scanning line starts to be generated; and adjusting means for adjusting the time at which the first scanning line starts to be generated, in accordance with the time-delay interval.

Preferably, the scanning apparatus further includes: a third laser beam detector fixed at a position to detect the second scanning laser beam before the second scanning laser beam starts generating the second scanning line; a fourth laser beam detector fixed at a position to detect the second scanning laser beam after the second scanning laser beam has completed generating the second scanning line; second measuring means for measuring a second time interval between a time of detection of the third laser beam detector and a time of detection of the fourth laser beam detector; second determining means for comparing a predetermined value with a value corresponding to the second time interval to determine a second-time-delay interval between the time of detection of the third laser beam detector and a time at which the second scanning line starts to be generated; and second adjusting means for adjusting the time at which the second scanning line starts to be generated, in accordance with the second-time-delay interval.

Preferably, the first laser scanning optical system includes a first polygon mirror for deflecting the first scanning laser beam, and wherein the second laser scanning optical system includes a second polygon mirror for deflecting the second scanning laser beam.

Preferably, the first polygon mirror deflects the first scanning laser beam to scan a part of the scanning surface to generate the first scanning line, and the second polygon mirror deflects the second scanning laser beam to scan another part of the scanning surface to generate the second scanning line, wherein the first laser beam detector detects the first scanning laser beam before the first scanning laser beam scans the part of the scanning surface, and wherein the second laser beam detector detects the first scanning laser beam after the first scanning laser beam has completed scanning the part of the scanning surface.

Preferably, the first polygon mirror deflects the first scanning laser beam to scan a part of the scanning surface to generate the first scanning line, wherein the second polygon mirror deflects the second scanning laser beam to scan another part of the scanning surface to generate the second scanning line, wherein the first laser beam detector detects the first scanning laser beam before the first scanning laser beam scans the part of the scanning surface, wherein the second laser beam detector detects the first scanning laser beam after the first scanning laser beam has completed scanning the part of the scanning surface, wherein the third laser beam detector detects the second scanning laser beam before the second scanning laser beam scans the another part of the scanning surface, and wherein the fourth laser beam detector detects the second scanning laser beam after the second scanning laser beam has completed scanning the another part of the scanning surface.

Preferably, the first and second polygon mirrors rotate in opposite rotational directions so that the first and second scanning laser beams respectively scan the part and the another part of the scanning surface from an approximate center of the scanning surface toward respective opposite ends of the scanning surface in opposite directions.

The present disclosure relates to subject matter contained in Japanese Patent Application No.9-410 (filed on Jan. 6, 1997) which is expressly incorporated herein by reference in its entirety.

BRIEF DESCRIPTION OF THE DRAWINGS

The invention will be described below in detail with reference to the accompanying drawings in which similar members are indicated by similar reference numerals, and wherein.

DESCRIPTION OF THE PREFERRED EMBODIMENTS

Figure 1:
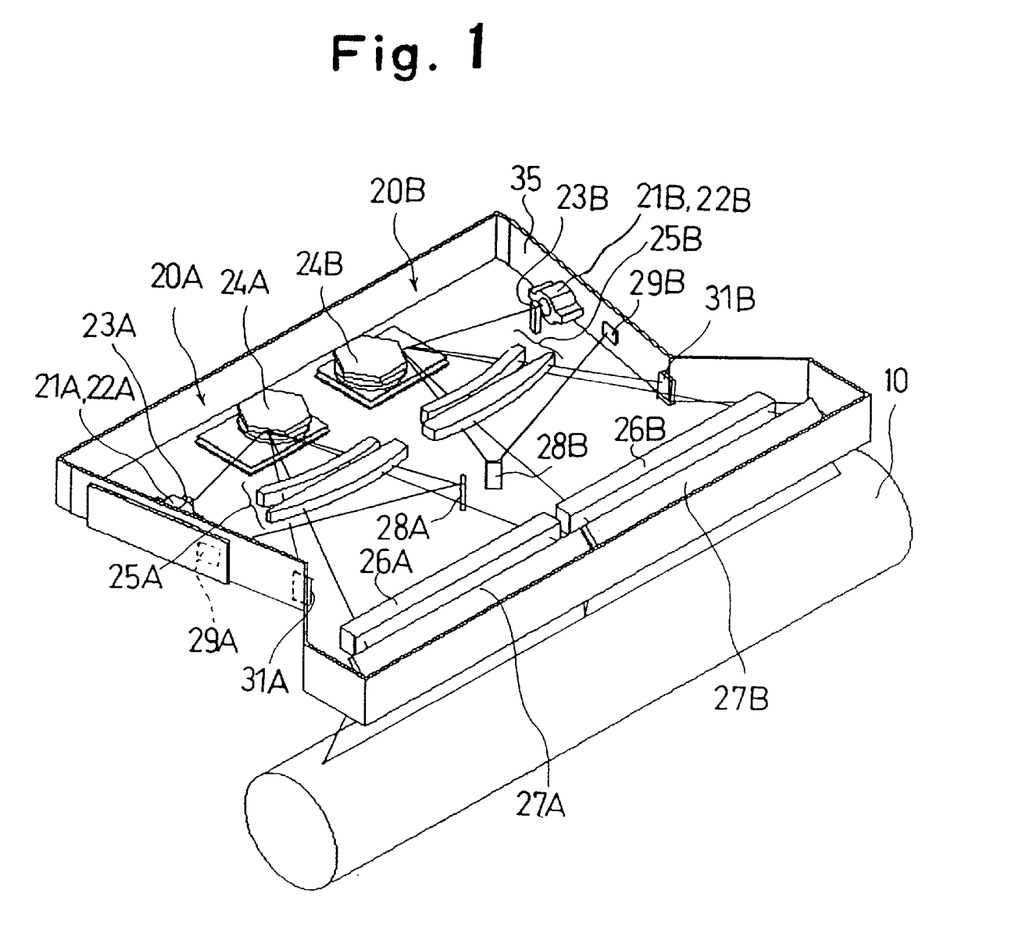
FIG. 1 is a perspective view of an embodiment of a cascade scanning optical system to which the present invention is applied, showing only fundamental elements thereof.

FIG. 1 shows an embodiment of a cascade scanning optical system for scanning the photoconductive surface of a photoconductive drum (rotating member) 10 provided in a laser-beam printer (scanning apparatus). The cascade scanning optical system is provided with a pair of laser scanning optical systems, i.e., a first scanning optical system 20A and a second scanning optical system 20B. The first and second optical systems 20A and 20B are each designed as a non-telecentric system, so that the incident angle of a scanning laser beam emitted from each of the first and second optical systems 20A and 20B relative to the photoconductive surface of the drum 10 varies in accordance with a variation in the position of the scanning spot of the scanning laser beam on the photoconductive surface in the main scanning direction. The first and second scanning optical systems 20A and 20B are provided with the same optical elements or parts, that is, the first scanning optical system 20A is provided with a laser collimating unit 21A serving as a laser beam emitter, a cylindrical lens 23A, a polygon mirror (scanning laser beam deflector) 24A, an fθ lens group 25A, an auxiliary lens 26A and a mirror 27A, while the second scanning optical system 20B is provided with a laser collimating unit 21B serving as a laser beam emitter, a cylindrical lens 23B, a polygon mirror (scanning laser beam deflector) 24B, an fθ lens group 25B, an auxiliary lens 26B and a mirror 27B. Each of the fθ lens groups 25A and 25B consists of two lens elements as can be seen from FIG. 1. In the present embodiment of the cascade scanning optical system, in each fθ lens group at least one of the two lens elements is a plastic lens element. The first and second scanning optical systems 20A and 20B are arranged side by side in a direction parallel to the axial direction of the drum 10 and are supported by a common casing 35 on an inner flat surface thereof.

The laser collimating units 21A and 21B are identical. Each of the laser collimating units 21A and 21B is provided therein with a laser diode LD and a collimating lens group (not shown) for collimating a laser beam emitted from the laser diode LD. In each of the first and second scanning optical systems 20A and 20B, the laser beam emitted from the laser diode LD is collimated through the collimating lens group. Thereafter this collimated laser beam is incident upon the cylindrical lens 23A or 23B positioned in front of the corresponding laser collimating unit 21A or 21B. Each cylindrical lens 23A or 23B has a power in the sub-scanning direction, so that the laser beam incident on the cylindrical lens is condensed therethrough in the sub-scanning direction to be incident on the corresponding polygon mirror 24A or 24B. The polygon mirrors 24A and 24B are each rotated, so that laser beams incident thereon are deflected in the main scanning direction to proceed toward the mirrors 27A and 27B through the fθ lens groups 25A and 25B and the auxiliary lenses 26A and 26B, respectively. Subsequently, the laser beams incident upon the mirrors 27A and 27B are reflected thereby towards the photoconductive drum 10, to thereby scan the same in the main scanning direction.

Each of the auxiliary lenses 26A and 26B has a power mainly in the sub-scanning direction. In order to reduce the size of the cascade scanning optical system, it is possible to omit each of the auxiliary lenses 26A and 26B. In such a case, the design of the fθ lens groups 25A and 25B would be modified in such a way that they would have the equivalent power to that of the combined power of the original fθ lens groups 25A and 25B and the auxiliary lenses 26A and 26B, respectively. The auxiliary lenses 26A and 26B and the mirrors 27A and 27B are illustrated only in FIG. 1.

The polygon mirror 24A rotates in a clockwise direction while the polygon mirror 24B rotates in a counterclockwise direction, as viewed in FIG. 2. Namely, the polygon mirrors 24A and 24B rotate in opposite rotational directions to scan the photoconductive surface of the drum 10 from its approximate center toward respective opposite ends in opposite directions.

A mirror 28A is fixedly provided in the casing 35 at a position to receive the scanning laser beam emitted from the fθ lens group 25A before the scanning laser beam is incident on the photoconductive surface of the drum 10 through the auxiliary lens 26A and the mirror 27A at each scanning sweep while the polygon mirror 24A rotates. The laser beam reflected by the mirror 28A is incident on a laser beam detector (BD) 29A fixedly provided in the casing 35 at a position opposite to the mirror 28A. Accordingly, the commencement of each scanning sweep made by the first scanning optical system 20A is detected by the laser beam detector 29A via the mirror 28A.

Likewise, a mirror 28B is fixedly provided in the casing 35 at a position to receive the scanning laser beam emitted from the fθ lens group 25B before the scanning laser beam is incident on the photoconductive surface of the drum 10 through the auxiliary lens 26B and the mirror 27B at each scanning sweep while the polygon mirror 24B rotates. The laser beam reflected by the mirror 28B is incident on a laser beam detector (BD) 29B fixedly provided in the casing 35 at a position opposite to the mirror 28B. Accordingly, the commencement of each scanning sweep made by the second scanning optical system 20B is detected by the laser beam detector 29B via the mirror 28B.

A laser beam detector (SOE) 31A is fixedly provided in the casing 35 at a position in the vicinity of the laser beam detector 29A to receive the scanning laser beam emitted from the fθ lens group 25A after the scanning laser beam has completed a single scanning at each scanning sweep while the polygon mirror 24A rotates. Accordingly, the completion of each scanning sweep made by the first scanning optical system 20A is detected by the laser beam detector 31A.

Likewise, a laser beam detector (SOE) 31B is fixedly provided in the casing 35 at a position in the vicinity of the laser beam detector 29B to receive a laser beam emitted from the fθ lens group 25B after the scanning laser beam has completed a single scanning at each scanning sweep while the polygon mirror 24B rotates. Accordingly, the completion of each scanning sweep made by the second scanning optical system 20B is detected by the laser beam detector 31B.

The laser diodes LD of the laser collimating units 21A and 21B are each controlled by a processor (not shown) to turn its laser emission ON or OFF in accordance with given image data to draw a corresponding image (charge-latent image) on the photoconductive surface of the drum 10, and subsequently this image drawn on the photoconductive surface of the drum 10 is transferred to plain paper according to a conventional electrophotographic method. The aforementioned image data input to the processor may be supplied thereto from a computer (not shown). The polygon mirrors 24A and 24B are synchronously controlled such that on the photoconductive surface of the drum 10, respective spots of the scanning laser beams deflected by the polygon mirrors 24A and 24B move from an approximate center in opposite directions apart from each other in the main scanning direction to thereby form a wide scanning line (comprised of the pair of scanning lines) on the photoconductive surface of the drum 10. With the rotational movement of the photoconductive drum 10 which is synchronized to the rotational movement of each of the polygon mirrors 24A and 24B, a series of wide scanning lines are made on the photoconductive surface of the drum 10 to thereby obtain a certain image (charge-latent image) on the photoconductive surface of the drum 10.

Figure 3:
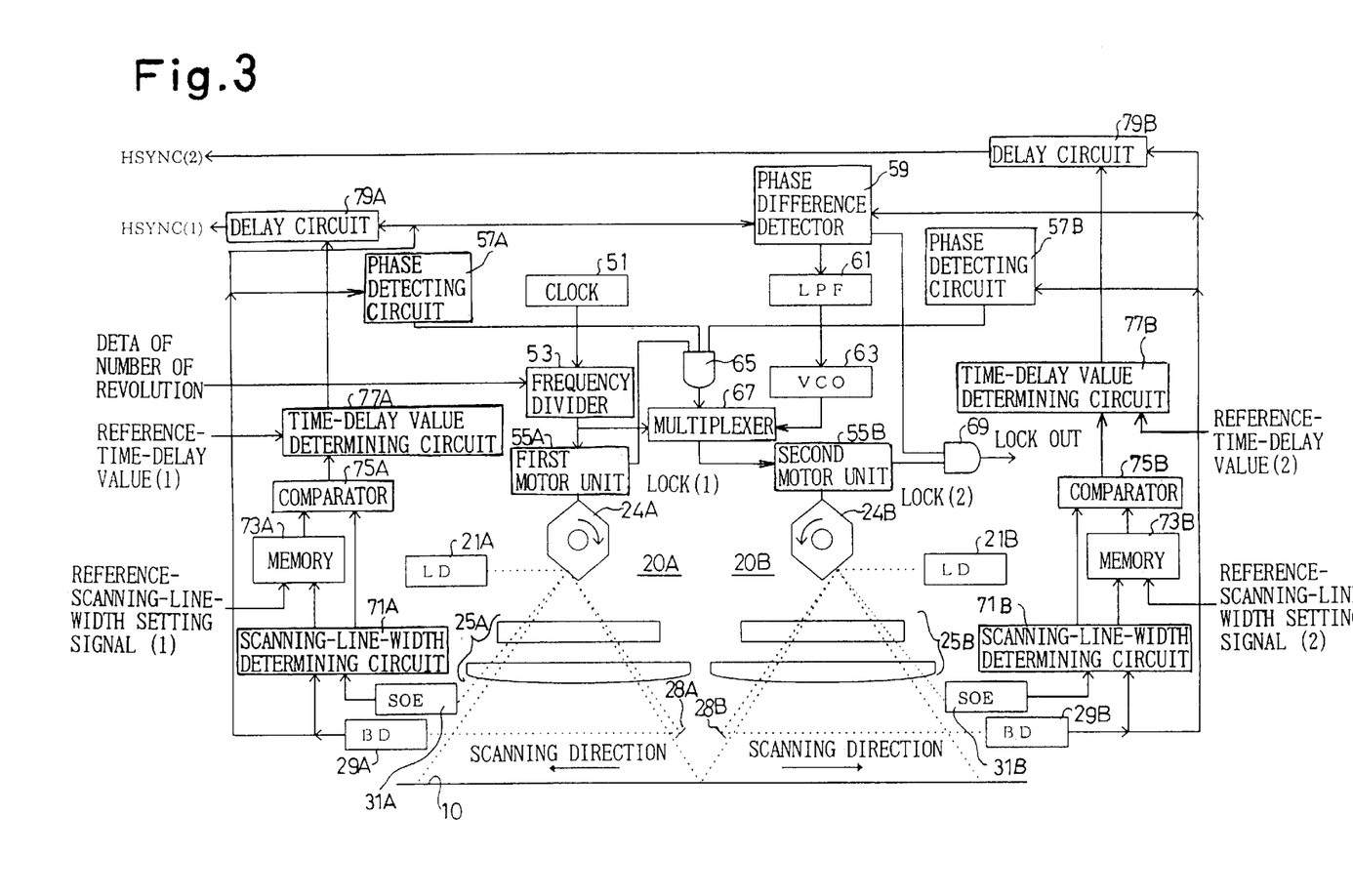
FIG. 3 is a block diagram of a first embodiment of a circuit for controlling the cascade scanning optical system shown in FIG. 1.

FIG. 3 shows a first embodiment of a circuit for controlling the cascade scanning optical system shown in FIG. 1. This first embodiment is characterized by a scanning-commencement-position-adjusting process. In this process, in each of the first and second scanning optical systems 20A and 20B, the time interval between the time of detection of the laser beam detector 29A (or 29B) and the time of detection of the laser beam detector 31A (or 31B) is measured to determine the width of the scanning line made by the corresponding scanning laser beam on the photoconductive surface of the drum 10, and the scanning-commencement position of writing of each scanning line on the photoconductive surface of the drum 10 (i.e., the position on the photoconductive surface of the drum 10 at which the ON/OFF modulation of the scanning laser beam starts) is appropriately adjusted in the main scanning direction in accordance with the size of the determined width, so that respective opposing ends of the pair of scanning lines are not apart from each other nor overlap each other in the main scanning direction. For instance, in each of the first and second scanning optical systems 20A and 20B, in the case where the measured time interval is shorter than the original time interval (reference time interval) due to, for example, a deformation of the plastic-made fθ lens, the scanning laser beam would be that as represented by the dotted line 3 if a time interval equal to the original time interval is given for writing each scanning line on the drum 10. Conversely, in each of the first and second scanning optical systems 20A and 20B, in the case where the measured time interval is longer than the original time interval due to, for example, a deformation of the plastic-made fθ lens, the scanning laser beam would be that as represented by the one-dot-chain line 2 if a time interval equal to the original time interval is given for writing each scanning line on the drum 10. In the first embodiment of the control circuit, in each of the first and second scanning optical systems 20A and 20B, the scanning-commencement position of writing of each scanning line on the photoconductive surface of the drum 10 is appropriately adjusted in the main scanning direction by detecting the time interval between the time of detection of the laser beam detector 29A (or 29B) and the time of detection of the laser beam detector 31A (or 31B).

The first and second polygon mirrors 24A and 24B are rotated by first and second motor units 55A and 55B, respectively. When the first and second motor units 55A and 55B start operating upon the power switch turned ON, the motor units 55A and 55B are each controlled, rotating with common clock pulses output from a frequency divider 53 which receives clock pulses from a clock pulse generator 51. Clock pulses output from the frequency divider 53 are directly input to the first motor unit 55A, whereas clock pulses output from the frequency divider 53 are input to the second motor unit 55B through a multiplexer 67. Immediately after the power switch is turned ON, the multiplexer 67 does not adjust the clock pulses input from the frequency divider 53 but merely has the input clock pulses pass therethrough to be input to the second motor unit 55B. Each motor unit 55A, 55B is provided with a motor having a drive shaft on which the corresponding polygon mirror 24A or 24B is fixed.

The laser beam detector 29A outputs a signal to each of: a phase detecting circuit 57A; a scanning-line-width determining circuit 71A; a delay circuit 79A; and a phase-difference detector 59 at the time the laser beam detector 29A detects a scanning laser beam. Likewise, the laser beam detector 29B outputs a signal to each of: a phase detecting circuit 57B; a scanning-line-width determining circuit 71B; a delay circuit 79B; and the phase-difference detector 59 at the time the laser beam detector 29B detects a scanning laser beam.

The signals output from the laser beam detectors 29A and 29B are input to the delay circuits 79A and 79B, respectively, so that signals output from the laser beam detectors 29A and 29B are each delayed by a specified time interval (time-delay value) to be input to the aforementioned processor (not shown). Each of the delay circuits 79A and 79B inputs the value of the time interval (time-delay value) from a corresponding time-delay-value determining circuit 77A or 77B. The signals output from the laser beam detectors 29A and 29B are input as horizontal synchronizing pulses HSYNC to the processor through the delay circuits 79A and 79B so that the signals are used as reference signals for commencing an operation of writing main scanning data, namely, writing each main scanning line. That is, the processor operates to perform a single scanning (i.e., to draw a horizontal line extending in the main scanning direction on the drum 10) each time a predetermined time-span elapses. Every time a completed horizontal line is drawn on the drum 10, the photoconductive drum 10 is rotated by a predetermined amount of rotation corresponding to one horizontal line so that the following horizontal line is drawn on the drum 10.

The phase difference detector 59 determines a phase difference between the phase of signals output from the laser beam detector 29A and the phase of signals output from the laser beam detector 29B in accordance with the signals input from the laser beam detectors 29A and 29B to output a phase difference indicating voltage to both an LPF (low pass filter) 61 and an AND gate 69. The terms "phase difference indicating voltage" herein used mean a voltage which indicates the magnitude of a phase difference.

A lock signal is output from the second motor unit 55B to be input to the AND gate 69 according to the PLL control of the second motor unit 55B. Therefore, the AND gate 69 outputs a lock-out signal to the aforementioned processor when inputting both a phase-match indicating signal output from the phase difference detector 59 and a lock signal output from the second motor unit 55B. The processor starts a scanning operation upon inputting the lock-out signal output from the AND gate 69.

In the case where the phase of signals output from the laser beam detector 29B follows the phase of signals output from the laser beam detector 29A, the phase-difference detector 59 outputs a positive phase difference indicating voltage to the LPF 61. Conversely, in the case where the phase of signals output from the laser beam detector 29B precedes the phase of signals output from the laser beam detector 29A, the phase-difference detector 59 outputs a negative phase difference indicating voltage to the LPF 61.

Upon inputting a phase difference indicating voltage output from the phase difference detector 59, the LPF 61 converts the phase difference indicating voltage into a DC voltage corresponding to the magnitude of the input phase difference indicating voltage. Subsequently, the LPF 61 outputs the DC voltage to the VCO (voltage controlled oscillator) 63. The VCO 63 changes the frequency of clock pulses output therefrom in accordance with the DC voltage input from the LPF 61 to output the changed frequency of clock pulses to the multiplexer 67. The multiplexer 67 outputs the input clock pulses to the second motor unit 55B, and the second motor unit 55B rotates the second polygon mirror 24B at a rotational speed based on the clock pulses input from the multiplexer 67. The VCO 63 outputs clock pulses having a high frequency to the multiplexer 67 when the DC voltage input from the LPF 61 is a high voltage, while the VCO 63 outputs clock pulses having a low frequency to the multiplexer 67 when the DC voltage input from the LPF 61 is a low voltage. The multiplexer 67 adjusts clock pulses input from the frequency divider 53 in accordance with clock pulses input from the VCO 63 to output the adjusted clock pulses to the second motor unit 55B. Accordingly, in the case where the phase of signals output from the laser beam detector 29B follows that of the laser beam detector 29A, the rotational speed of the second motor unit 55B increases. Conversely, in the case where the phase of signals output from the laser beam detector 29B precedes that of the laser beam detector 29A, the rotational speed of the second motor unit 55B decreases. Consequently, the phase of rotation of the second polygon mirror 24B is coincident with the phase of rotation of the first polygon mirror 24A.

The multiplexer 67 sends the clock pulses input from the frequency divider 53 to the second motor unit 55B when no lock signal for the PLL control from the first motor unit 55A has been received from the first motor unit 55A, or when respective signals are received from the phase detecting circuits 57A and 57B at the same time, even when receiving the lock signal from the first motor unit 55A. During the time of receiving the lock signal from the first motor unit 55A, the multiplexer 67 sends the clock pulses input from the VCO 63 to the second motor unit 55B when respective signals are not received from the phase detecting circuits 57A and 57B at the same time. Thereafter, when it is detected that the phase of signals output from the laser beam detector 29B matches the phase of signals output from the laser beam detector 29A, the multiplexer 67 allows the pulses received from the frequency divider 53 to pass therethrough to input the received pulses to the second motor unit 55B, thereby the motor units 55A and 55B are synchronously controlled, rotating with common clock pulses.

After the rotation of each of the motor units 55A and 55B has become stable and the PLL (phase-lock loop) has started, the aforementioned scanning-commencement-position-adjusting process starts.

In this process, the scanning-line-width determining circuit 71A first measures the time interval between the time of detection of the laser beam detector 29A and the time of detection of the laser beam detector 31A to determine the width of the scanning line, made by the corresponding scanning laser beam on the photoconductive surface of the drum 10. Subsequently, the scanning-line-width determining circuit 71A outputs the value of the determined width to a memory 73A which stores the same therein. Likewise, the scanning-line-width determining circuit 71B first measures the time interval between the time of detection of the laser beam detector 29B and the time of detection of the laser beam detector 31B to determine the width of the scanning line, made by the corresponding scanning laser beam on the photoconductive surface of the drum 10. Subsequently, the scanning-line-width determining circuit 71B outputs the value of the determined width to a memory 73B which stores the same therein.

The value (reference value) of a reference width which is to be compared with the value of the determined width is also stored in each of the memories 73A and 73B. The value of the reference width may be pre-stored in a memory (not shown) such as an EEPROM or set by a dip switch to output the value of the reference width to each of the memories 73A and 73B.

A comparator 75A compares the value of the reference width with the value of the determined width which are input from the memory 73A to determine the difference between the two values. Subsequently the comparator 75A outputs the determined difference value to the time-delay-value determining circuit 77A. The value (time-delay value) of a predetermined time-interval as a reference-time-delay value has previously been input to the time-delay-value determining circuit 77A. The time-delay-value determining circuit 77A determines an appropriate time-delay value in accordance with the input reference-time-delay value and the input difference value to output the determined appropriate time-delay value to the delay circuit 79A. Due to the delay circuit 79A to which the appropriate time-delay value is input, the scanning-commencement position of writing of each scanning line made by the first scanning optical system 20A (hereinafter referred to as "first commencement position") is appropriately adjusted to be positioned at the original position at which the first commencement position is located when the fθ lens group 25A has not been deformed at all.

Likewise, a comparator 75B compares the value of the reference width with the value of the determined width which are input from the memory 73B to determine the difference between the two values. Subsequently the comparator 75B outputs the determined difference value to the time-delay-value determining circuit 77B. The value (time-delay value) of the predetermined time-interval as a reference-time-delay value has previously been input to the time-delay-value determining circuit 77B. The time-delay-value determining circuit 77B determines an appropriate time-delay value in accordance with the input reference-time-delay value and the input difference value to output the determined appropriate time-delay value to the delay circuit 79B. Due to the appropriate time-delay value input to the delay circuit 79B, the scanning-commencement position of writing of each scanning line made by the second scanning optical system 20B (hereinafter referred to as "second commencement position") is appropriately adjusted to be positioned at the original position at which the second commencement position is located when the plastic-made fθ lens group 25B has not been deformed at all.

As can be understood from the foregoing, according to the scanning-commencement-position-adjusting process unique to the first embodiment of the control circuit, each of the first and second commencement positions is appropriately adjusted to be positioned at the corresponding original position, so that respective opposing ends of the pair of scanning lines are not apart from each other nor overlap each other in the main scanning direction. Consequently, a straight and continuous scanning line using a combination of separate scanning lines can be formed.

Figure 4:
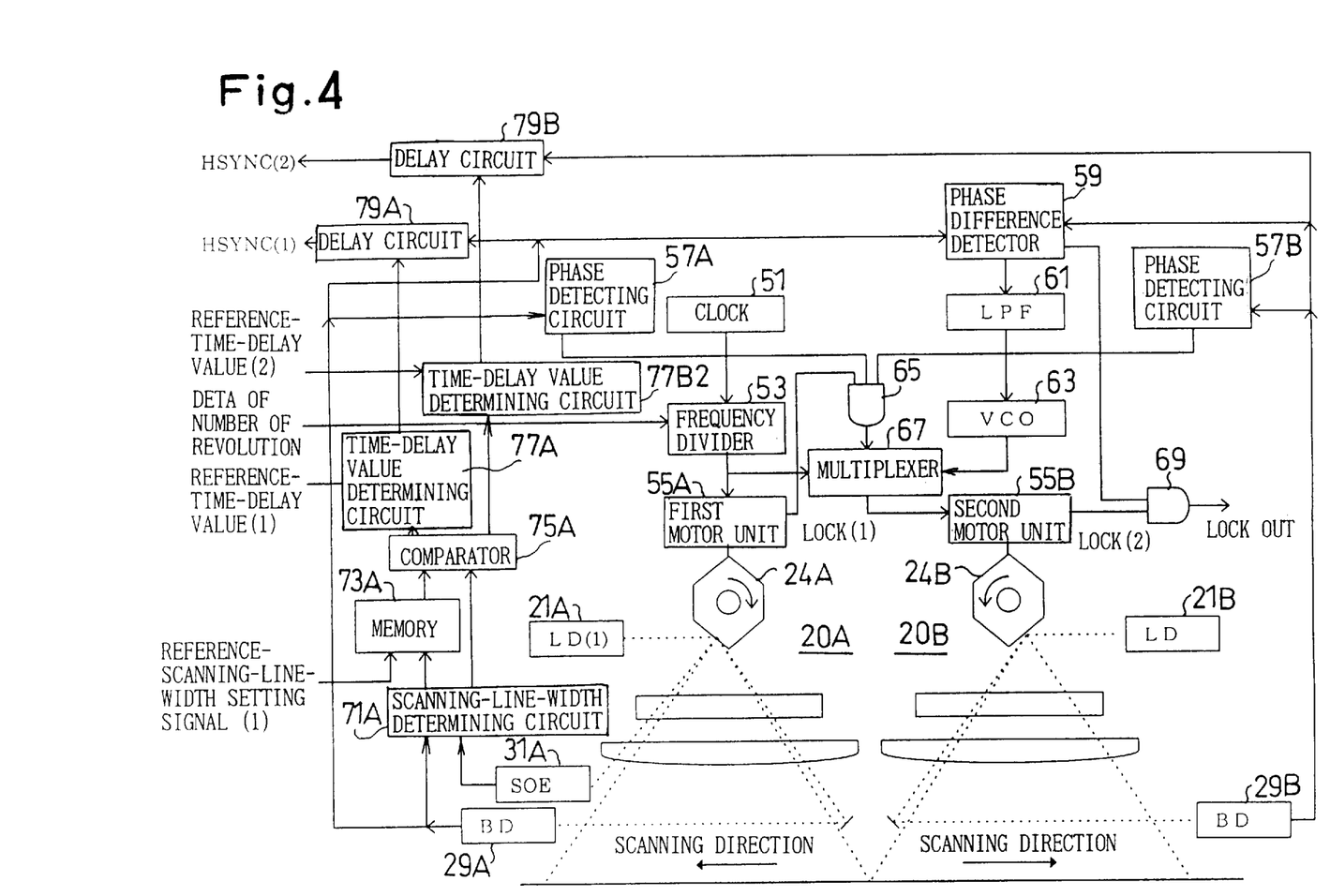
FIG. 4 is a block diagram of a second embodiment of a circuit for controlling the cascade scanning optical system shown in FIG. 1.

FIG. 4 shows a second embodiment of the circuit for controlling the cascade scanning optical system shown in FIG. 1. In the scanning-commencement-position-adjusting process of the first embodiment of the control circuit, the width of one of the pair of scanning lines and the width of the other scanning line are each determined independently of the other and the first and second commencement positions are each adjusted independently of the other according to the size of the corresponding determined width, whereas only the width of one of the pair of scanning lines, which is made by the first scanning optical system 20A, is determined and the first and second commencement positions are each adjusted according to the size of the same determined width in the scanning-commencement-position-adjusting process of the second embodiment of the control circuit. The width of either one of the pair of scanning lines is considered substantially identical to the width of the other scanning line because the first and second scanning optical systems 20A and 20B are each composed of the same optical elements or parts in the present embodiment of the cascade scanning optical system, so that a similar effect can be expected according to the second embodiment of the control circuit.

In the second embodiment of the control circuit, the laser beam detector 31B, the scanning-line-width determining circuit 71B, the memory 73B, the comparator 75B and the time-delay-value determining circuit 77B, which are provided in the first embodiment of the control circuit, are not provided. However, in the second embodiment of the control circuit, a time-delay-value determining circuit 77B2 is provided for determining an appropriate time-delay value in accordance with the input reference-time-delay value and the input difference value to output the determined appropriate time-delay value to the delay circuit 79B. The time-delay-value determining circuit 77B2 inputs the determined difference value from the comparator 75A. Therefore, in this second embodiment the comparator 75A supplies the same determined difference value to each of the time-delay-value determining circuits 77A and 77B2.

Figure 5:
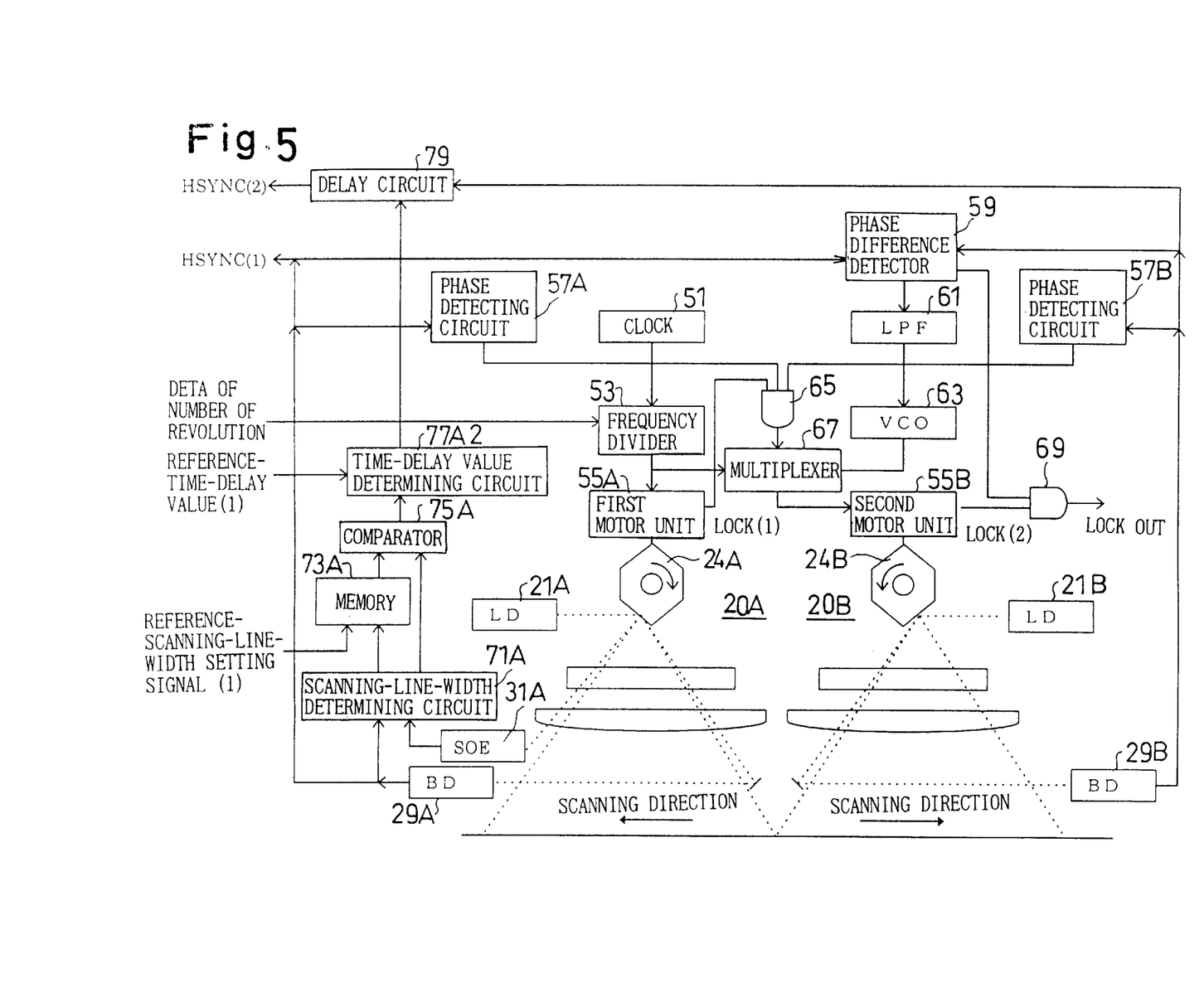
FIG. 5 is a block diagram of a third embodiment of a circuit for controlling the cascade scanning optical system shown in FIG. 1.

FIG. 5 shows a third embodiment of a circuit for controlling the cascade scanning optical system shown in FIG. 1. In the scanning-commencement-position-adjusting process of either the first or second embodiment the first and second commencement positions are each adjusted, whereas in the scanning-commencement-position-adjusting process of the third embodiment only the width of one of the pair of scanning lines, which is made by the first scanning optical system 20A, is determined and only the second commencement position is adjusted relative to the first commencement position according to a size double that of the determined width.

In the third embodiment of the control circuit, the laser beam detector 31B, the scanning-line-width determining circuit 71B, the memory 73B, the comparator 75B and the time-delay-value determining circuit 77B, which are provided in the first embodiment of the control circuit, are not provided. Moreover, the delay circuits 79A and 79B, which are provided in the first embodiment of the control circuit, are not provided. However, a time-delay-value determining circuit 77A2 and a delay circuit 79 are provided in the third embodiment of the control circuit. The delay circuit 79 inputs a signal output from the laser beam detector 29B and a time-delay value output from the time-delay-value determining circuit 77A2. The time-delay-value determining circuit 77A2 determines an appropriate time-delay value in accordance with the input reference-time-delay value and a size double that of the input difference value to output the determined appropriate time-delay value to the delay circuit 79, so that the signal output from the laser beam detector 29B is delayed by a time interval corresponding to the determined appropriate time-delay value to be input to the processor (not shown). According to such a scanning-commencement-position-adjusting process, an effect similar to that of the first embodiment can be expected.

Figure 6:
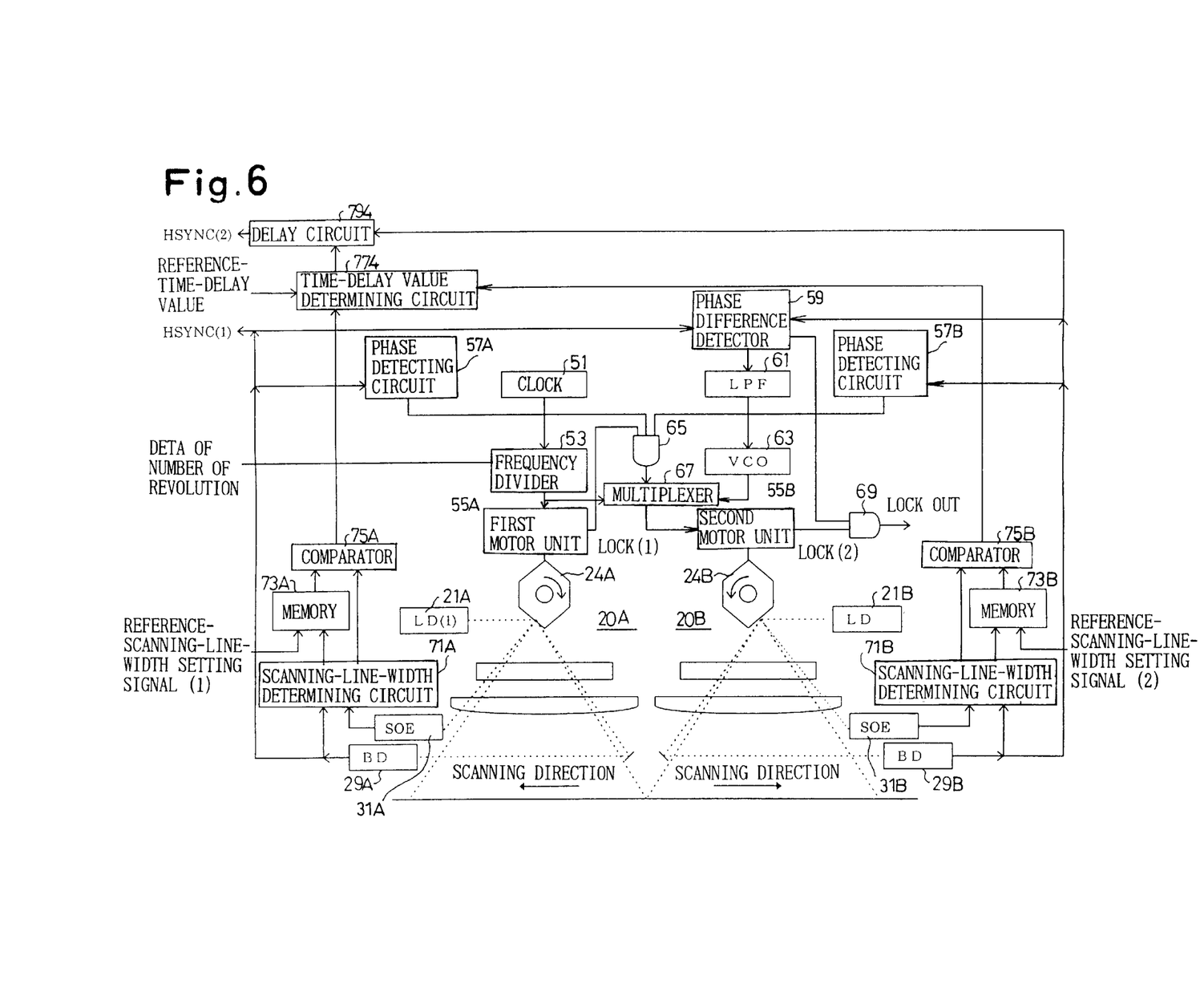
FIG. 6 is a block diagram of a fourth embodiment of a circuit for controlling the cascade scanning optical system shown in FIG. 1.

FIG. 6 shows a fourth embodiment of a circuit for controlling the cascade scanning optical system shown in FIG. 1. In the scanning-commencement-position-adjusting process of the fourth embodiment, the width of one of the pair of scanning lines (first width) and the width of the other scanning line (second width) are each determined. Subsequently the difference (first difference) between the first width and the corresponding reference width and the difference (second difference) between the second width and the corresponding reference width are each determined, and only the second commencement position is adjusted relative to the first commencement position according to the value (difference value) of the sum of the first and second differences.

In the fourth embodiment of the control circuit, the time-delay-value determining circuits 77A and 77B and the delay circuits 79A and 79B, which are provided in the first embodiment of the control circuit, are not provided. However, a delay circuit 794 and a time-delay-value determining circuit 774 are provided in the fourth embodiment of the control circuit. The comparator 75A outputs the determined difference value to the time-delay-value determining circuit 774. The time-delay-value determining circuit 774 determines an appropriate time-delay value in accordance with the input reference-time-delay value and the aforementioned value of the sum of the respective difference values input from the comparators 75A and 75B. Subsequently the time-delay-value determining circuit 774 outputs the determined appropriate time-delay value to the delay circuit 794. Consequently, the signal output from the laser beam detector 29B is delayed by a specified time interval corresponding to the determined appropriate time-delay value to be input to the processor (not shown). According to such a scanning-commencement-position-adjusting process, an effect similar to that of the first embodiment can be expected.

In each of the first and fourth embodiments of the control circuits, once each of the memories 73A and 73B stores the value of the determined width output from the corresponding scanning-line-width determining circuit 71A or 71B, the stored value of the determined width together with the previously-stored reference value continues to be used by the corresponding comparator 75A or 75B from that time on.

Similarly, in each of the second and third embodiments of the control circuits, once the memory 73A stores the value of the determined width output from the scanning-line-width determining circuit 71A, the stored value of the determined width together with the previously-stored reference value continues to be used by the comparator 75A from that time on.

According to any one of the first through fourth embodiments of the control circuits, at least one of the first and second commencement positions is adjusted, so that the opposing ends of the pair of scanning lines are not apart from each other nor overlap each other in the main scanning direction, to thereby form a straight and continuous scanning line without a gap or overlap between the pair of scanning lines. Furthermore, according to any one of the first through fourth embodiments of the control circuits, in the case where a phase difference occurs between the phase of rotation of the first polygon mirror 24A and the phase of rotation of the second polygon mirror 24B, namely, a difference in the rotational speed occurs between the first and second polygon mirrors 24A and 24B, the phase difference is determined by the phase difference detector 59 in accordance with the signals input from the laser beam detectors 29A and 29B; clock pulses corresponding to the magnitude of the phase difference are generated through the LPF 61 and the VCO 63; and the second motor unit 55B is controlled, rotating with the generated clock pulses, so that the phase difference between the rotation of the first polygon mirror 24A and the rotation of the second polygon mirror 24B is eliminated.

In each of the first and second embodiments of the control circuits, in addition to the aforementioned process in which the time interval between the moment of detection of the laser beam detector 29A (or 29B) and the moment of commencement of the writing of a scanning line is adjusted through the delay circuit 79A (or 79B), the first and second commencement positions may be additionally adjusted in accordance with the ratio of the value of the measured time interval between the moment of detection of the laser beam detector 29A (or 29B) and the moment of detection of the laser beam detector 31A (or 31B) to the value of a reference time interval.

Similarly, in each of the third and fourth embodiments of the control circuits, in addition to the aforementioned process in which the time interval between the moment of detection of the laser beam detector 29A (or 29B) and the moment of commencement of the writing of a scanning line is adjusted through the delay circuit 79 (or 794), the first commencement position may be additionally adjusted in accordance with the ratio of the value of the measured time interval between the moment of detection of the laser beam detector 29A (or 29B) and the moment of detection of the laser beam detector 31A (or 31B) to the value of a reference time interval.

In each of the first through fourth embodiments of the control circuits, the scanning-commencement-position-adjusting process may be performed not only upon the power switch being turned ON but also upon the completion of the writing of all scanning lines on each sheet of (plain) paper or during idle time of the scanning apparatus when the power switch is ON.

Although the polygon mirrors 24A and 24B are rotated in opposite rotational directions to scan the photoconductive surface of the drum 10 from its approximate center toward respective opposite ends in opposite directions, the polygon mirrors 24A and 24B may be rotated in the same rotational direction to scan the photoconductive surface of the drum 10.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A scanning apparatus having a cascade scanning optical system, comprising:

a first laser scanning optical system that deflects a first scanning laser beam to scan a scanning surface to generate a first scanning line during a modulation of said first scanning laser beam in accordance with a first given image data;

a second laser scanning optical system that deflects a second scanning laser beam to scan said scanning surface to generate a second scanning line during a modulation of said second scanning laser beam in accordance with a second given image data, wherein said first and second laser scanning optical systems are arranged so as to align said first scanning line with said second scanning line at a point of contact therebetween in a main scanning direction to form a single scanning line;

a first laser beam detector fixed at a position to detect said first scanning laser beam before said first scanning laser beam starts generating said first scanning line;

a second laser beam detector fixed at a position to detect said first scanning laser beam after said first scanning laser beam has completed generating said first scanning line;

a measuring device that measures a time interval between a time of detection of said first laser beam detector and a time of detection of said second laser beam detector;

a determining device that compares a value corresponding to said time interval with a predetermined value to determine a time-delay interval between said time of detection of said first laser beam detector and a time at which said first scanning line starts to be generated; and an adjusting device that adjusts said time at which said first scanning line starts to be generated, in accordance with said time-delay interval.

2. The scanning apparatus according to claim 1, further comprising:

a third laser beam detector fixed at a position to detect said second scanning laser beam before said second scanning laser beam starts generating said second scanning line;

a fourth laser beam detector fixed at a position to detect said second scanning laser beam after said second scanning laser beam has completed generating said second scanning line;

a second measuring device for measuring a second time interval between a time of detection of said third laser beam detector and a time of detection of said fourth laser beam detector;

a second determining device that compares a predetermined value with a value corresponding to said second time interval to determine a second-time-delay interval between said time of detection of said third laser beam detector and a time at which said second scanning line starts to be generated; and a second adjusting device that adjusts said time at which said second scanning line starts to be generated, in accordance with said second-time-delay interval.

3. The scanning apparatus according to claim 2, wherein said first laser scanning optical system comprises a first polygon mirror that deflects said first scanning laser beam, and said second laser scanning optical system comprises a second polygon mirror that deflects said second scanning laser beam.

4. The scanning apparatus according to claim 3, wherein said first polygon mirror deflects said first scanning laser beam to scan a part of said scanning surface to generate said first scanning line;

said second polygon mirror deflects said second scanning laser beam to scan another part of said scanning surface to generate said second scanning line;

said first laser beam detector detects said first scanning laser beam before said first scanning laser beam scans said part of said scanning surface;

said second laser beam detector detects said first scanning laser beam after said first scanning laser beam has completed scanning said part of said scanning surface;

said third laser beam detector detects said second scanning laser beam before said second scanning laser beam scans said another part of said scanning surface; and said fourth laser beam detector detects said second scanning laser beam after said second scanning laser beam has completed scanning said another part of said scanning surface.

5. The scanning apparatus according to claim 4, wherein said first and second polygon mirrors rotate in opposite rotational directions so that said first and second scanning laser beams respectively scan said part and said another part of said scanning surface from an approximate center of said scanning surface toward respective opposite ends of said scanning surface in opposite directions.

6. The scanning apparatus according to claim 2, further comprising a storage device that stores said second-time-delay interval;

wherein said second adjusting device continues to adjust said time at which said second scanning line starts to be generated, in accordance with said second time-delay interval, after said storage device has stored said second time-delay interval.

7. The scanning apparatus according to claim 1, wherein said first laser scanning optical system comprises a first polygon mirror that deflects said first scanning laser beam, and said second laser scanning optical system comprises a second polygon mirror that deflects said second scanning laser beam.

8. The scanning apparatus according to claim 7, wherein said first polygon mirror deflects said first scanning laser beam to scan a part of said scanning surface to generate said first scanning line;

said second polygon mirror deflects said second scanning laser beam to scan another part of said scanning surface to generate said second scanning line;

said first laser beam detector detects said first scanning laser beam before said first scanning laser beam scans said part of said scanning surface; and said second laser beam detector detects said first scanning laser beam after said first scanning laser beam has completed scanning said part of said scanning surface.

9. The scanning apparatus according to claim 8, wherein said first and second polygon mirrors rotate in opposite rotational directions so that said first and second scanning laser beams respectively scan said part and said another part of said scanning surface from an approximate center of said scanning surface toward respective opposite ends of said scanning surface in opposite directions.

10. The scanning apparatus according to claim 1, further comprising:

a third laser beam detector fixed at a position to detect said second scanning laser beam before said second scanning laser beam starts generating said second scanning line;

a fourth laser beam detector fixed at a position to detect said second scanning laser beam after said second scanning laser beam has completed generating said second scanning line;

a second measuring device that measures a second time interval between a time of detection of said third laser beam detector and a time of detection of said fourth laser beam detector; and a second adjusting device that adjusts said time at which said second scanning line starts to be generated, in accordance with said time-delay interval.

11. The scanning apparatus according to claim 1, wherein said adjusting device adjusts said time at which said first scanning line starts to be generated, in accordance with a size equal to twice said time-delay interval.

12. The scanning apparatus according to claim 1, further comprising:
   a third laser beam detector fixed at a position to detect said second scanning laser beam before said second scanning laser beam starts generating said second scanning line;
   a fourth laser beam detector fixed at a position to detect said second scanning laser beam after said second scanning laser beam has completed generating said second scanning line;
   a second measuring device that measures a second time interval between a time of detection of said third laser beam detector and a time of detection of said fourth laser beam detector; and
   a second determining device that compares a predetermined value with a value corresponding to said second time interval to determine a second-time-delay interval between said time of detection of said third laser beam detector and a time at which said second scanning line starts to be generated;
   wherein said adjusting device adjusts said time at which said first scanning line starts to be generated, in accordance with said time-delay interval and said second-time-delay interval.

13. The scanning apparatus according to claim 1, further comprising a storage device that stores said time-delay interval;
   wherein said adjusting device continues to adjust said time at which said first scanning line starts to be generated, in accordance with said time-delay interval, after said storage device has stored said time-delay interval.

14. The scanning apparatus according to claim 1, further comprising a processor that modulates said first and second scanning laser beams in accordance with said first and second given image data, respectively;
   wherein said processor starts modulating each of said first and second scanning laser beams in accordance with a signal output from said adjusting device.

15. The scanning apparatus according to claim 1, further including a drum having said scanning surface on a periphery of said drum.

16. The scanning apparatus according to claim 1, wherein said first and second laser scanning optical systems are composed of the same optical elements.

17. The scanning apparatus according to claim 16, wherein said first and second laser scanning optical systems are symmetrically arranged.

* * * * *